June 11, 1946.     P. J. KIBLER     2,402,055
AUTOMATIC PHASE SYNCHRONIZING SYSTEM FOR SYNCHRONOUS MOTORS
Filed Feb. 16, 1945

Inventor
PAUL J. KIBLER

By  Scrivener & Parker
Attorneys

Patented June 11, 1946

2,402,055

UNITED STATES PATENT OFFICE 2,402,055

AUTOMATIC PHASE SYNCHRONIZING SYSTEM FOR SYNCHRONOUS MOTORS

Paul J. Kibler, Fort Wayne, Ind., assignor to Washington Institute of Technology, Inc., Washington, D. C., a corporation of Delaware Application February 16, 1945, Serial No. 578,291

6 Claims. (Cl. 172—289)

This invention relates generally to synchronous motors and, more particularly, to systems for controlling the operation of such motors.

The principal object of this invention is to provide a system for controlling the operation of a synchronous motor to cause the rotor thereof, regardless of the number of its poles, to always synchronize in a predetermined relation to the phase of the supply voltage.

Other objects and features of novelty of the invention will be made apparent by the following description and the annexed drawing which, it will be understood, are only illustrative of the invention and impose no limitation thereon not imposed by the appended claims.

Figure 1:
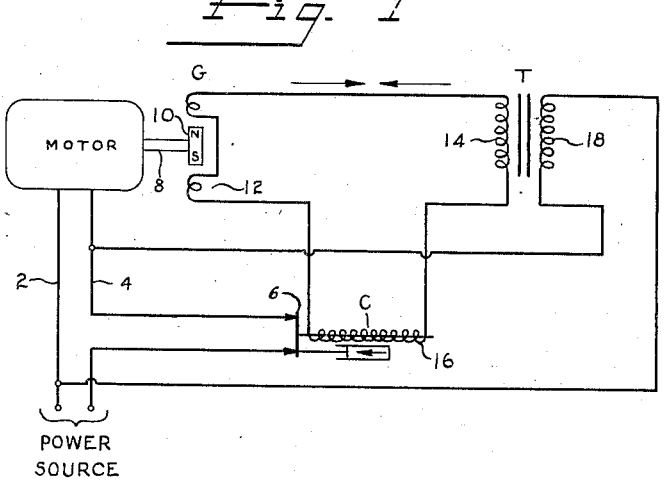
Figure 2:
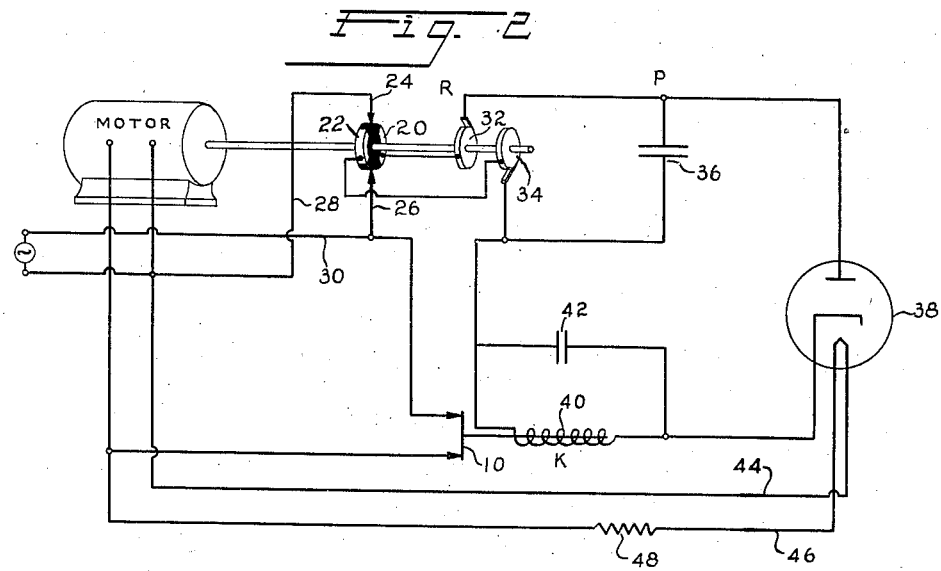
Figure 3:
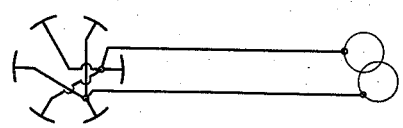

Referring to the drawing, in which similar reference numerals refer to like parts, Fig. 1 is a schematic circuit diagram of a control system according to my invention, Fig. 2 is a schematic circuit diagram of a preferred embodiment of the invention, and Fig. 3 illustrates the modification of the system of Fig. 2 which must be made to adapt the same to the control of a motor having a commutator having six segments.

A system according to the invention is disclosed in Fig. 1 and comprises a bi-polar synchronous motor which is supplied with energy from a source by wires 2, 4, the latter of which includes the normally closed contact member 6 of a relay of the slow-operate, quick-release type. The motor has an armature shaft 8 which carries the bi-polar rotor 10 of a generator G having winding 12, which is connected in series with the secondary winding 14 of a transformer T and the operating coil 16 of the relay. The primary winding 18 of transformer T is connected across the supply leads 2, 4. The phase of the output voltage of generator G is so adjusted that when the rotor of the motor is in the desired position relative to the phase of the supply voltage, the output of generator G is in phase opposition to the output voltage of transformer T, as indicated by the arrows in Fig. 1. In this condition the voltage across the relay coil 16 is approximately zero and the relay contacts remain closed. If the rotor synchronizes in the alternate undesired position of a bi-polar motor, the voltage across the relay coil is approximately twice the voltage output of generator G.

The operation of the described system is as follows. Upon application of the supply voltage the motor starts, accelerates and finally synchronizes in some position relative to the phase of the supply voltage. As the motor starts, the relay contact begins to open, as the rotor has not reached synchronized speed, but because of the time delay action of the relay, the relay contact is not opened until after a stable condition of voltage across the relay coil is reached. If, when such stable condition is reached, the rotor is in the desired predetermined position relative to the phase of the supply voltage the voltage across the relay coil will be approximately zero and the relay contacts will remain closed, maintaining the supply of energy to the motor. If, however, the rotor is not in such predetermined position the voltage output of generator G will be in phase with that of transformer T and the voltage across the relay coil will be a maximum, thus operating the relay and disconnecting the motor from the supply of energy. The motor will therefore slow down to the extent of "slipping a pole" and the voltage output of the generator G will be reduced. When it reaches a sufficiently low value the relay contacts will be released and the motor will speed up. This cycle will be repeated until the motor synchronizes with its rotor in the proper position.

The system of Fig. 1 may be applied to a synchronous motor of $n$ poles, provided only that the rotor of generator G has a like number of poles.

A preferred embodiment of the invention is disclosed in Fig. 2. In this system the shaft of the bi-polar motor carries a commutator having two segments 20, 22 which are contacted by brushes 24, 26 which are connected across the source of energy by wires 28, 30 and which may be angularly adjusted with respect to the commutator in known manner. The shaft also carries slip-rings 32, 34, each of which is electrically connected to one of the commutator segments, and in parallel with which is connected a conventional rectifier input condenser 36. One slip-ring 32 is connected to the plate of a heated cathode type rectifier tube 38 while the other slip-ring 34 is connected through the operating coil 40 of a direct current operated relay K to the cathode of tube 38. A condenser 42 is connected across the coil 40. The heater of tube 38 is connected across the source of energy by wires 44, 46, the latter of which includes a resistor 48 of proper size to reduce the line voltage to the necessary value for heating the filament of the tube.

The operation of the described system is as follows. With tube 38 removed from its socket and the motor running, the commutator brushes are adjusted until the direct current potential produced by the commutator and measured across condenser 36 is a maximum. With a two-pole motor and a two-segment commutator this potential will be positive for one relative position of synchronization and negative for the other. With a motor of $n$ poles and a commutator of $n$ poles this potential will be positive for $n/2$ alternate positions of synchronization and negative for $n/2$ positions. However, in any case it will be a maximum for only one position. The source of power is disconnected from the system, the tube 38 is placed in its socket and power is then re-applied to the system, causing the motor to accelerate to synchronous speed while the tube heats. After the cathode of the tube reaches operating temperature, if point P, which is the common terminal of slipring 32 and condenser 36, is negative in polarity the motor will continue to operate, while if this point is positive tube 38 will conduct and relay K will be energized. The relay will remain energized for a small interval of time dependent upon the capacity of condenser 42, during which time the motor, being disconnected from the source of energy, slips a number of poles. If this number is odd, nothing further occurs after de-energization of relay K. However, if the number is even, the relay K is reenergized, the relay contacts open, and the described cycle is repeated. Thus, with a motor having $n$ poles and a commutator having $n$ segments, one of $n/2$ desired relative positions of synchronization is automatically selected. With a motor of several poles and a two-segment commutator the relay K must be designed to operate only on the maximum voltage previously mentioned. In such case only one position will be automatically selected. However, in this case provision must be made for manually starting the motor, and the relay contacts must be reversed so that the motor operates with the relay energized. Thus, the motor continues in operation in the desired position of synchronization, but is automatically shut down if this position is lost. It is noted that in the case being described the commutator segments should be angularly small, so that only one of $n/2$ positions results in a sharply defined positive (or negative) voltage output from the rectifier. This will allow considerably more latitude in relay design.

In Fig. 3 of the drawing there are disclosed the connections for a commutator having six segments, alternate segments being connected together and to the slip-rings. The system disclosed in Fig. 2 may be employed with a motor having $n$ poles and a commutator having a like number of poles.

While I have described and illustrated certain embodiments of my invention, it will be apparent to those skilled in the art that other embodiments, as well as modifications of those disclosed, may be made without departing in any way from the spirit or scope of the invention, for the limits of which reference must be made to the appended claims.

What is claimed is:

1. A system for causing a synchronous motor to synchronize with the rotor in a predetermined mechanical position with respect to the phase of the supply voltage, comprising a source of energy for the motor, time delay relay means having normally closed contacts connecting the source to the motor, but being operable upon energization to disconnect the source from the motor, means operated by the motor for generating alternating current, and means for combining in the coil of the relay the alternating current generated by said means with an approximately equal alternating current from the source, said currents being in phase opposition when the rotor is in said predetermined relation to the phase of the supply voltage and being in phase addition in other cases to thereby energize the relay.

2. A system for causing a synchronous motor to synchronize with the rotor in a predetermined mechanical position with respect to the phase of the supply voltage, comprising a source of energy for the motor, means operable in other than said predetermined position of the rotor for producing a current, means connecting the source to the motor and operable by such current to disconnect the source from the motor, and means for preventing the flow of such current until the motor has reached synchronous speed after starting.

3. A system according to claim 2 in which the means for producing a current comprise a mechanical rectifier operated by the motor and supplied by the source and a vacuum tube rectifier.

4. A system according to claim 2 in which the means operable to disconnect the source from the motor comprises a relay normally connecting the source to the motor.

5. A system according to claim 2 in which the means operable to disconnect the source from the motor comprises a relay normally connecting the source to the motor, and a condenser in parallel with the coil of the relay to delay reclosing of the contacts of the relay after the relay is energized.

6. A system according to claim 2 in which the last-named means comprises a heater type rectifier tube, the heater of which is connected across the motor supply terminals.

PAUL J. KIBLER.